(12) United States Patent
Shoji

(10) Patent No.: US 8,875,238 B2
(45) Date of Patent: Oct. 28, 2014

(54) AUTHENTICATION SERVERS

(75) Inventor: Takuya Shoji, Tokyo (JP)

(73) Assignee: NEC Corporation, Tokyo (JP)

(*) Notice: Subject to any disclaimer, the term of this patent is extended or adjusted under 35 U.S.C. 154(b) by 188 days.

(21) Appl. No.: 13/123,935

(22) PCT Filed: Sep. 14, 2009

(86) PCT No.: PCT/JP2009/066016
§ 371 (c)(1),
(2), (4) Date: Apr. 13, 2011

(87) PCT Pub. No.: WO2010/050311
PCT Pub. Date: May 6, 2010

(65) Prior Publication Data
US 2011/0202973 A1  Aug. 18, 2011

(30) Foreign Application Priority Data

Oct. 28, 2008 (JP) ................. 2008-276683

(51) Int. Cl.
G06F 17/30 (2006.01)
H04M 15/00 (2006.01)
H04W 12/06 (2009.01)
H04L 29/06 (2006.01)
H04L 12/14 (2006.01)
H04W 28/08 (2009.01)
H04L 29/12 (2006.01)
H04W 4/24 (2009.01)
G06F 15/16 (2006.01)

(52) U.S. Cl.
CPC ............... H04W 4/24 (2013.01); H04M 15/00 (2013.01); H04W 12/06 (2013.01); H04L 63/08 (2013.01); H04L 12/14 (2013.01); H04W 28/08 (2013.01); H04L 61/2015 (2013.01); H04L 12/1403 (2013.01)
USPC .................. 726/3; 713/168; 726/21

(58) Field of Classification Search
CPC ....... H04W 12/06; H04W 2/24; H04W 28/08; H04L 12/1403; H04L 63/0892; H04M 15/00
See application file for complete search history.

(56) References Cited

U.S. PATENT DOCUMENTS 7,167,466 B2 * 1/2007 Chowdhury et al. ......... 370/349
7,343,158 B2 * 3/2008 Mizell et al. ............... 455/435.1

(Continued)

FOREIGN PATENT DOCUMENTS

CN  101032134 A  9/2007
EP  1 848 173 A1  10/2007

(Continued)

OTHER PUBLICATIONS

Casey, Base Station Controlled Load Balancing with Handovers in Mobile WiMax, Helsinki University of Technology, Department of Electrical and Communications Engineering Communications Laboratory, Jan. 10, 2008, pp. 1-109.*

(Continued)

Primary Examiner — Kaveh Abrishamkar
Assistant Examiner — James J Wilcox
(74) Attorney, Agent, or Firm — Sughrue Mion, PLLC

(57) ABSTRACT

An authentication server manages traffic data with respect to each connection device, the traffic data representing a traffic amount, with respect to the connection device, that is contained in a charging information notification signal that provides notification of charging information transmitted from the connection device, compares the traffic data with respect to each connection device with a preset threshold, and assigns one of a plurality of connection devices as a connection device that connects a communication terminal and a network based on the compared result.

8 Claims, 11 Drawing Sheets

(56) References Cited

U.S. PATENT DOCUMENTS

| | | | |
|---|---|---|---|
| 7,424,102 B2 * | 9/2008 | Koskinen et al. | 379/114.22 |
| 7,447,162 B1 * | 11/2008 | Leung et al. | 370/252 |
| 7,519,354 B2 * | 4/2009 | Lee et al. | 455/411 |
| 7,565,134 B2 * | 7/2009 | Hurtta et al. | 455/405 |
| 7,882,541 B2 * | 2/2011 | Yasaki et al. | 726/2 |
| 7,944,913 B2 * | 5/2011 | Ogasahara | 370/386 |
| 8,589,590 B1 * | 11/2013 | Breau et al. | 709/245 |
| 2002/0002470 A1 * | 1/2002 | Arai | 705/1 |
| 2004/0063402 A1 | 4/2004 | Takeda et al. | |
| 2007/0237317 A1 * | 10/2007 | Suda | 379/112.04 |
| 2008/0159125 A1 | 7/2008 | Ando et al. | |
| 2008/0318568 A1 * | 12/2008 | Zhang | 455/422.1 |
| 2009/0129271 A1 * | 5/2009 | Ramankutty et al. | 370/235 |
| 2009/0129275 A1 * | 5/2009 | Watanabe et al. | 370/235 |

FOREIGN PATENT DOCUMENTS

| | | |
|---|---|---|
| EP | 1 940 112 A2 | 7/2008 |
| JP | 2004120270 A | 4/2004 |
| JP | 2004200789 A | 7/2004 |
| JP | 2004350078 A | 12/2004 |
| JP | 2007-4361 A | 1/2007 |
| JP | 2007004361 A | 1/2007 |
| JP | 2008167022 A | 7/2008 |
| TW | 200704021 | 1/2007 |
| WO | 2004/079542 A2 | 9/2004 |
| WO | WO 2007074511 A1 * | 7/2007 |

OTHER PUBLICATIONS

Kelly, "Charging and Accounting for Bursty Connections," Presented at MIT Workshop on Internet Economics, Mar. 1995, retrieved from https://web.archive.org/web/19980115164312/http://www.press.umich.edu/jep/works/KellyCharg.html, pp. 1-7.*
International Search Report for PCT/JP2009/066016 mailed Dec. 28, 2009.
M. Kulkarni et al., "Mobile IPv4 Dynamic Home Agent (HA) Assignment", Network Working Group, RFC4433, Mar. 2006.
Taiwanese Office Action and Search Report for TW Application No. 098135191 dated on Apr. 25, 2013 with Partial English Application.
Chinese Office Action for CN Application No. 200980141965.X issued on Apr. 22, 2013 with English Translation.
The Extended European Search Report of EP Application No. 09823424.8 dated Aug. 19, 2014.

* cited by examiner

Fig.7

| session ID | user ID | HA address | HoA | traffic data |
|---|---|---|---|---|
| 00000 | #0 | 500-1 | a | A |
| 00001 | #1 | 500-1 | b | B |
| 00002 | #2 | 500-2 | c | C |
| 00004 | #4 | 500-3 | d | D |
| 00005 | #5 | 500-1 | e | E |
| ⋮ | | | | |

Fig.8

| HA address | traffic data per total unit time |
|---|---|
| 500-1 | L |
| 500-2 | M |
| 500-3 | N |
| ⋮ | |

Fig.9

| HA address | assignment validity/invalidity information |
|---|---|
| 500-1 | invalid |
| 500-2 | valid |
| 500-3 | valid |
| ⋮ | |

AUTHENTICATION SERVERS

The present application is the National Phase of PCT/JP2009/066016, filed Sep. 14, 2009, which claims priority based on Japanese Patent Application JP 2008-276683 filed on Oct. 28, 2008, the entire contents of which being incorporated herein by reference in its entirety.

TECHNICAL FIELD

The present invention relates to authentication servers, communication systems, connection device assignment methods, and programs that allow communication terminals to communicate.

BACKGROUND ART

In recent years, as one type of radio communication system, WiMax (Worldwide Interoperability for Microwave Access) systems have gained increasing popularity.

FIG. 1 is a schematic diagram showing an exemplary structure of an ordinary WiMAX system.

The ordinary WiMAX system shown in FIG. 1 is provided with MS 1000, NAP 2000, and NSP 3000.

MS 1000 is a mobile communication terminal (MS: Mobile Station) that performs radio communication. Alternatively, MS 1000 may be a service station (SS: Service Station) that is an ordinary terminal that subscribes to a service.

NAP 2000 is a network access provider that is a provider that provides an access line through which MS 1000 is connected to a network.

In addition, NAP 2000 is provided with ASN 2100 that is an access service network (ASN: Access Service Network). Moreover, ASN 2100 is provided with ASN-GW (ASN-GW: Access Service Network—Gate way) 2200 that is a connection gate way that connects ASN 2100 and CSN 3100 (that will be described later) through R 3 (Reference Point 3).

NSP 3000 is a network service provider (Network Service Provider) that is a provider that provides MS 1000 for a service.

In addition, NSP 3000 is provided with CSN 3100 that is a core service network (CSN: Core Service Network). Moreover, CSN 3100 is provided with AAA 4000 and a plurality of HA 5000-1 through 5000-6.

AAA 4000 (AAA: Authentication, Authorization, and Accounting) is an authentication server that authenticates a user when he or she tries to connect MS 1000 to a network.

HA 5000-1 through 5000-6 (HA: Home Agent) are connection devices that connect MS 1000 and the network. It should be noted that although FIG. 1 shows 6 HAs, the number of HAs is not limited thereto.

In the system structured in such a manner, when MS 1000 is connected to the network, AAA 4000 dynamically assigns an HA that connects MS 1000 and the network from HA 5000-1 through 5000-6 (for example, refer to Non-Patent Literature 1).

In the following, a communication method employed for the WiMAX system structured as shown in FIG. 1 will be described.

FIG. 2 is a sequence chart describing an exemplary communication method employed for the WiMAX system structured as shown in FIG. 1.

When MS 1000 is connected to the network, the device/user of MS 1000 is authenticated.

At step 61, an EAP RQ Identity that requests identification information (Identity) based on an extensible authentication protocol (EAP: Extensible Authentication Protocol) is transmitted from ASN-GW 2200 to MS 1000.

Then, at step 62, an EAP RP Identify that is a response (RP: Response) to the EAP RQ Identity is transmitted from MS 1000 to AAA 4000.

Thereafter, at step 63, an authentication processing sequence is performed between MS 1000 and AAA 4000. When AAA 4000 successfully authenticates MS 1000, then at step 64, an EAP Success that denotes that the authentication is successful is transmitted from AAA 4000 to NAP 2000. In the authentication processing sequence at step 63, an HA address with respect to each MS 1000 is issued (assigned) to ASN-GW 2200 by AAA 4000. Such a specific issuance method has not yet been established. Here, the case in which HA 5000-1 has been assigned is exemplified and it will be described below.

When the EAP Success is received by ASN-GW 2000, then at step 65, the EAP Success is transmitted from ASN-GW 2200 to MS 1000.

Thereafter, the connection for MS 1000 is authenticated.

At step 66, a DHCP (Dynamic Host Configuration Protocol) Discover that is a signal that serves to obtain an IP (Internet Protocol) address is transmitted from MS 1000 to ASN-GW 2200.

Then, at step 67, a Registration Request that is a signal that serves to request registration is transmitted from ASN-GW 2200 to HA 5000-1.

When the Registration Request is received by HA 5000-1, then at step 68, an Access Request that is an access request signal that serves to request access is transmitted from HA 5000-1 to AAA 4000.

When the connection for MS 1000 is successfully authenticated by AAA 4000, then at step 69, an Access Accept that is a signal that serves to permit access is transmitted from AAA 4000 to HA 5000-1.

When the Access Accept is received by HA 5000-1, then at step 70, a Registration Reply that is a reply signal to the Registration Request is transmitted from HA 5000-1 to ASN-GW 2000.

Then, at step 71, a DHCP Offer in which an IP address that can be assigned to MS 1000 is embedded as "a user IP" is transmitted from ASN-GW 2200 to MS 1000.

Thereafter, a charging process is performed between HA 5000-1 and AAA 4000.

At step 72, an Accounting Request that is a charging information notification signal that is notified of charging information is transmitted from HA 5000-1 to AAA 4000.

Then, at step 73, an Accounting Response that is a response signal to the Accounting Request transmitted from HA 5000-1 at step 72 is transmitted from AAA 4000 to HA 5000-1.

At steps 74 and 75, the above-described Accounting Request and Accounting Response are exchanged between HA 5000-1 and AAA 4000 at a predetermined cycle and are based on a predetermined trigger.

Thereafter, at step 76, a signal (DHCP Release) that serves to return the IP address from MS 1000 is transmitted to ASN-GW 2200, and then, at step 77, a Registration Request in which "Lifetime" that represents the expiration of registration is set to "0" is transmitted from ASN-GW 2200 to HA 5000-1.

When the Registration Request is received by HA 5000-1, then at step 78, a Registration Reply that is a reply signal to the Registration Request is transmitted from HA 5000-1 to ASN-GW 2000.

Then, at step 79, the Accounting Request is transmitted from HA 5000-1 to AAA 4000. The Accounting Request that is transmitted contains information that denotes that the charging process is going to be completed.

Then, at step 80, the Accounting Response that is the reply signal to the Accounting Request transmitted from HA 5000-1 at step 79 is transmitted from AAA 4000 to HA 5000-1.

FIG. 3 is a sequence chart that describes another exemplary communication method employed for the WiMAX system structured as shown in FIG. 1. Here, the case in which HA 5000-2 has been assigned by AAA 4000 is exemplified and it will be described below. In this example, the case in which the existing load state of HA 5000-2 is "congestive" where HA 5000-2 cannot further perform the process will be described.

Like the connection method described with reference to FIG. 2, when MS 1000 is connected to a network, the device/user for MS 1000 is authenticated.

At step 91, an EAP RQ Identity that requests identification information based on the extensible authentication protocol is transmitted from ASN-GW 2200 to MS 1000.

Then, at step 92, an EAP RP Identify that is a response to the EAP RQ Identify is transmitted from MS 1000 to AAA 4000.

Thereafter, at step 93, an authentication processing sequence is performed between MS 1000 and AAA 4000. When AAA 4000 successfully authenticates MS 1000, then at step 94, an EAP Success that denotes that the authentication is successful is transmitted from AAA 4000 to ASN-GW 2000. In the authentication processing sequence at step 93, an HA address with respect to each MS 1000 is issued (assigned) to ASN-GW 2200. In this case, the address of HA 5000-2 is issued.

When ASN-GW 2000 receives the EAP Success, then at step 95, the EAP Success is transmitted from ASN-GW 2200 to MS 1000.

Thereafter, the connection for MS 1000 is authenticated.

At step 96, a DHCP Discover that is a signal that serves to obtain an IP address is transmitted from MS 1000 to ASN-GW 2200.

Then, at step 97, a Registration Request that is a signal that serves to request registration is transmitted from ASN-GW 2200 to HA 5000-2.

Then, since HA 5000-2 is "congestive," at step 98, the Registration Request transmitted from ASN-GW 2200 is discarded by HA 5000-2.

Thus, MS 1000 enters a disconnectable state.

In such a manner, although AAA 4000 assigns HA 5000-1 through 5000-6 to connect MS 1000 to the network, the assignment method is not yet established. As a result, depending on the operation (load) states of HA 5000-1 through 5000-6 assigned by AAA 4000, it may not be possible for MS 1000 and the network to be connected. To avoid such a situation, when AAA 4000 assigns one of HA 5000-1 through 5000-6, it is necessary to assign it in such a manner that the load states of HA 5000-1 through 5000-6 are distributed.

Thus, a load distribution device that distributes the processes performed by a plurality of processing devices (SIP servers) such that the processes are not concentrated in one part of each processing device has been contemplated (for example, refer to Patent Literature 1).

In addition, an AAA server that selects one home agent from among a plurality of home agents held in a management table based on a predetermined load distribution algorithm upon connection of a mobile terminal equivalent to MS 1000 to the network has been disclosed (for example, refer to as Patent Literature 2).

RELATED ART LITERATURES

Patent Literatures

Patent Literature 1: JP2007-004361A
Patent Literature 2: JP2008-167022A

Non-Patent Literatures

Non-Patent Literature 1: RFC 4433: Mobile IPv4 Dynamic Home Agent (HA) Assignment

SUMMARY OF THE INVENTION

Problem to be Solved by the Invention

However, in the technique disclosed in Patent Literature 1, since a dedicated load distribution device that distributes processes of a plurality of processing devices needs to be provided, there is a problem in which the cost increases.

On the other hand, in the technique disclosed in Patent Literature 2, since only the relationship of the connections between the AAA server and the HAs selected from an HA management table, based on the load distribution algorithm, is stored therein, managing whether the states of the HAs are congestive or not cannot be realized. In other words, since the AAA server cannot recognize the states of HAs that are operating, an HA assigned based on the load distribution algorithm might be congestive.

An object of the present invention is to provide authentication servers, communication systems, connection devices, assignment methods, and programs that can solve the above-described problem.

Means that Solve the Problem

To accomplish the above-described object, the present invention is an authentication server that is connected to a plurality of connection devices that connect a communication terminal and a network, that authenticates said communication terminal, and assigns one of said plurality of connection devices as a connection device that connects said communication terminal and said network if the authentication is successful, said authentication server comprising:

a storage section that stores a preset threshold;

a traffic management table that manages traffic data with respect to each said connection device, said traffic data representing a traffic amount, with respect to said connection device, that is contained in a charging information notification signal that provides notification of charging information transmitted from said connection device;

a comparison section that compares said traffic data with respect to each said connection device with the threshold stored in said storage section and writes the compared result as assignment validity/invalidity information to said storage section; and an HA assignment section that reads the assignment validity/invalidity information from said storage section and assigns a connection device other than connection devices whose assignment validity/invalidity information is invalid as a connection device that connects said connection terminal and said network.

In addition, a connection device assignment method that assigns a connection device that connects a communication terminal and a network from among a plurality of connection devices, said connection device assignment method comprising:

a step that manages traffic data with respect to each said connection device, said traffic data representing a traffic amount, with respect to said connection device, that is contained in a charging information notification signal that provides notification of charging information transmitted from said connection device;

a step that compares said traffic data with respect to each said connection devices with a preset threshold; and a step that assigns one of said plurality of connection devices as a connection device that connects said communication terminal and said network based on the compared result.

In addition, a program that causes an authentication server that is connected to a plurality of connection devices that connect a communication terminal and a network, that authenticates said communication terminal, and that if the authentication is successful, assigns one of said plurality of connection devices as a connection device that connects said communication terminal and said network to execute procedures comprises:

a procedure that manages traffic data with respect to each said connection device, said traffic data representing a traffic amount, with respect to said connection device, that is contained in a charging information notification signal that provides notification of charging information transmitted from said connection device;

a procedure that compares said traffic data with respect to each said connection device with a preset threshold; and a procedure that assigns one of said plurality of connection devices as a connection device that connects said communication terminal and said network based on the compared result.

Effect of the Invention

As described above, according to the present invention, since traffic data are managed with respect to each connection device, the traffic data representing a traffic amount, with respect to the connection device, that is contained in a charging information notification signal that provides notification of charging information transmitted from the connection device, the traffic data with respect to each connection device and a preset threshold are compared, and one of the plurality of connection devices is assigned as a connection device that connects the communication terminal and the network based on the compared result, thus a situation in which a disconnectable state occurs can be avoided.

BRIEF DESCRIPTION OF DRAWINGS

FIG. 7 is a schematic diagram showing exemplary charging information with respect to HAs and that are stored in a charging information table shown in FIG. 5.

FIG. 8 is a schematic diagram showing exemplary traffic data, with respect to each HA, that are stored in a traffic management table shown in FIG. 5.

FIG. 9 is a schematic diagram showing exemplary assignment validity/invalidity information stored in a storage section shown in FIG. 5.

MODES THAT CARRY OUT THE INVENTION

In the following, with reference to drawings, embodiments of the present invention will be described.

First Embodiment

Figure 1:
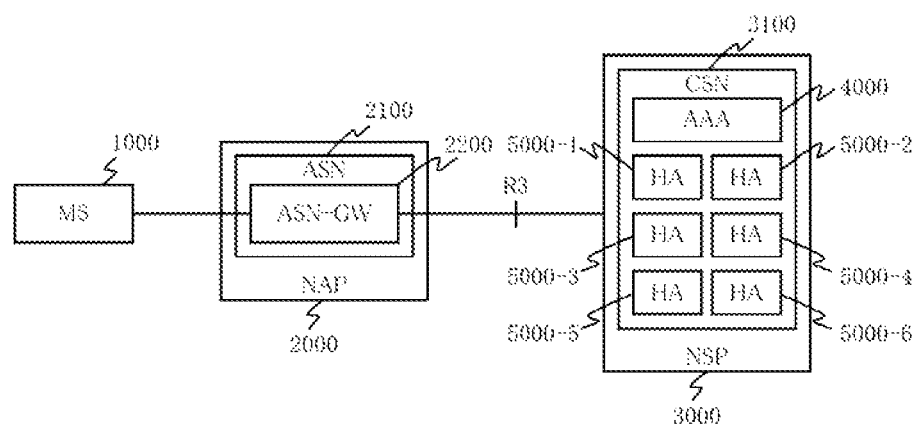
FIG. 1 is a schematic diagram showing an exemplary structure of an ordinary WiMAX system.
Figure 2:
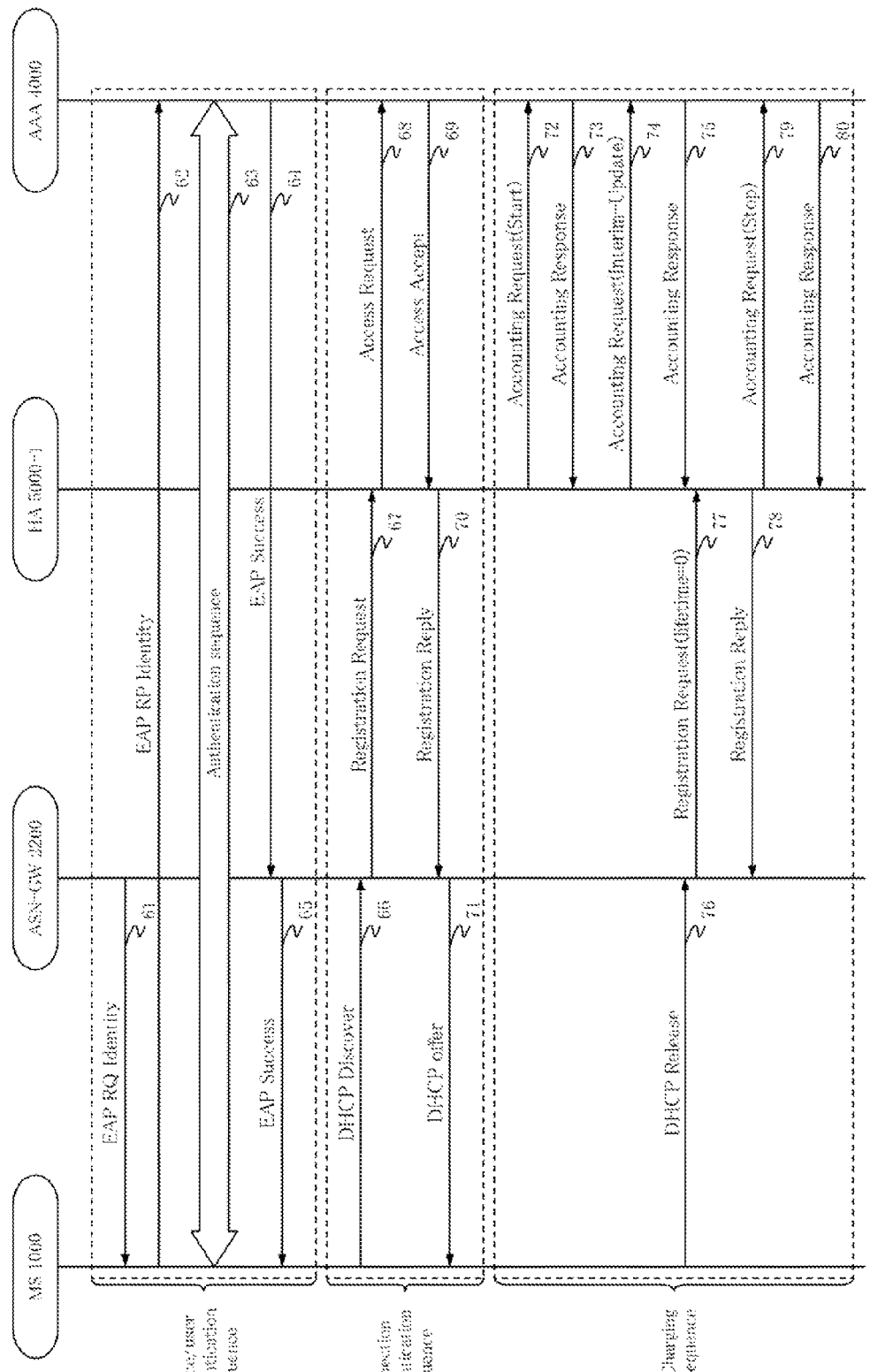
FIG. 2 is a sequence chart describing an exemplary communication method employed for the WiMAX system structured as shown in FIG. 1.
Figure 3:
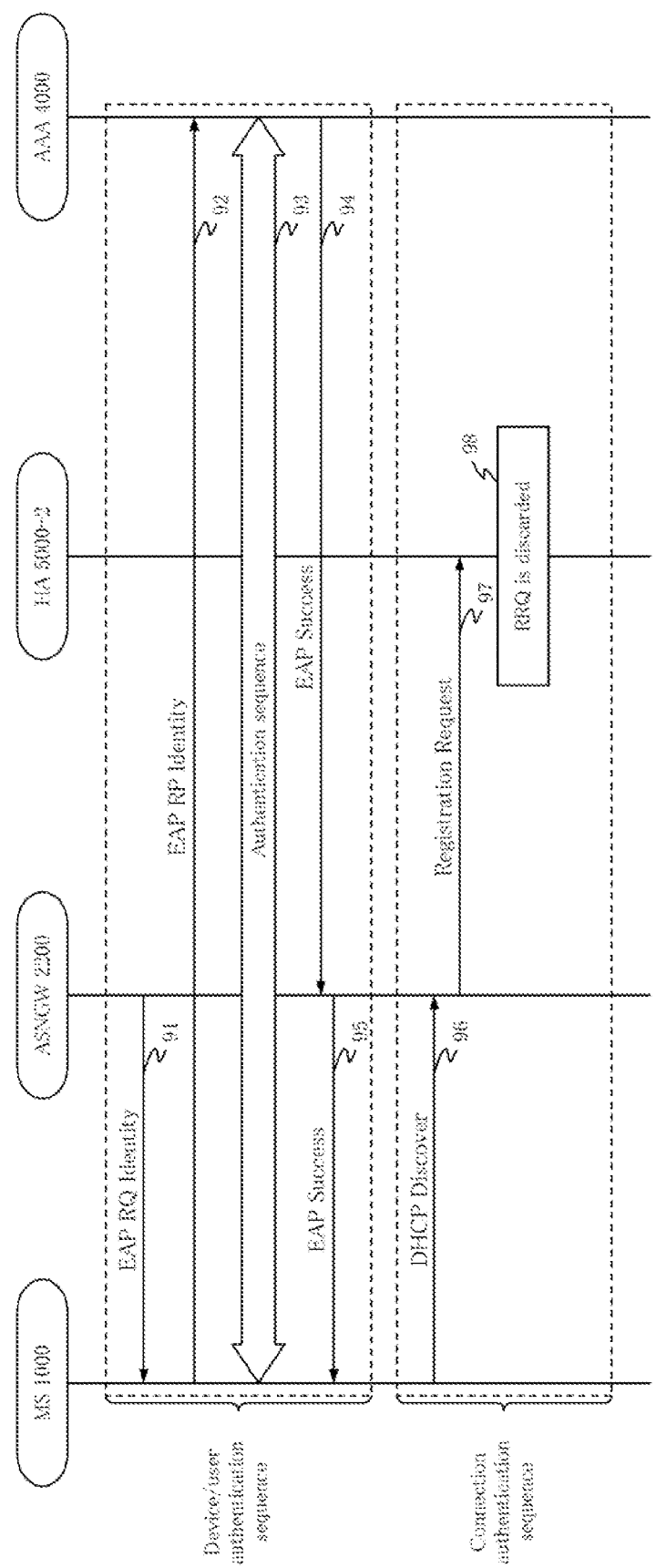
FIG. 3 is a sequence chart describing another exemplary communication method employed for the WiMAX system structured as shown in FIG. 1.
Figure 4:
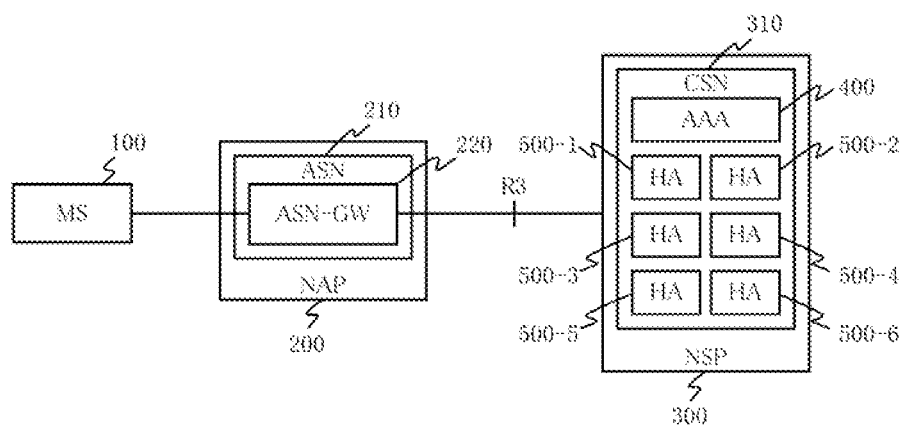
FIG. 4 is a schematic diagram showing a first embodiment of a communication system according to the present invention.

FIG. 4 is a schematic diagram showing a first embodiment of a communication system according to the present invention.

As shown in FIG. 4, this embodiment is composed of MS 100, NAP 200, and NSP 300.

MS 100 is a mobile communication terminal (MS: Mobile Station) that performs radio communication. Alternatively, MS 100 may be a service station (SS: Service Station) that is an ordinary terminal that subscribes to a service.

NAP 200 is a network access provider (Network Access Provider) that is a provider that provides an access line through which MS 100 is connected to a network.

In addition, NAP 200 is provided with ASN 210 that is an access service network (ASN: Access Service Network). Moreover, ASN 210 is provided with ASN-GW 220 (ASN-GW: Access Service Network—Gate Way) that is a connection gate way that connects ASN 210 and CSN 310 (that will be described later) through R 3 (Reference Point 3).

NSP 300 is a network service provider (Network Service Provider) that is a provider that provides MS 100 for a service.

In addition, NSP 300 is provided with CSN 310 that is a core service network (CSN: Core Service Network). Moreover, CSN 310 is provided with AAA 400 and a plurality of HA 500-1 through 500-6.

AAA 400 (AAA: Authentication, Authorization, and Accounting) is an authentication server that authenticates a user when he or she tries to connect MS 100 to a network.

HA 500-1 through 500-6 (HA: Home Agent) are connection devices that connect MS 100 and the network. Each of HA 500-1 through 500-6 has an IP (Internet Protocol) address that is identification information. It should be noted that although FIG. 4 shows 6 HAs, the number of HAs is not limited thereto.

Figure 5:
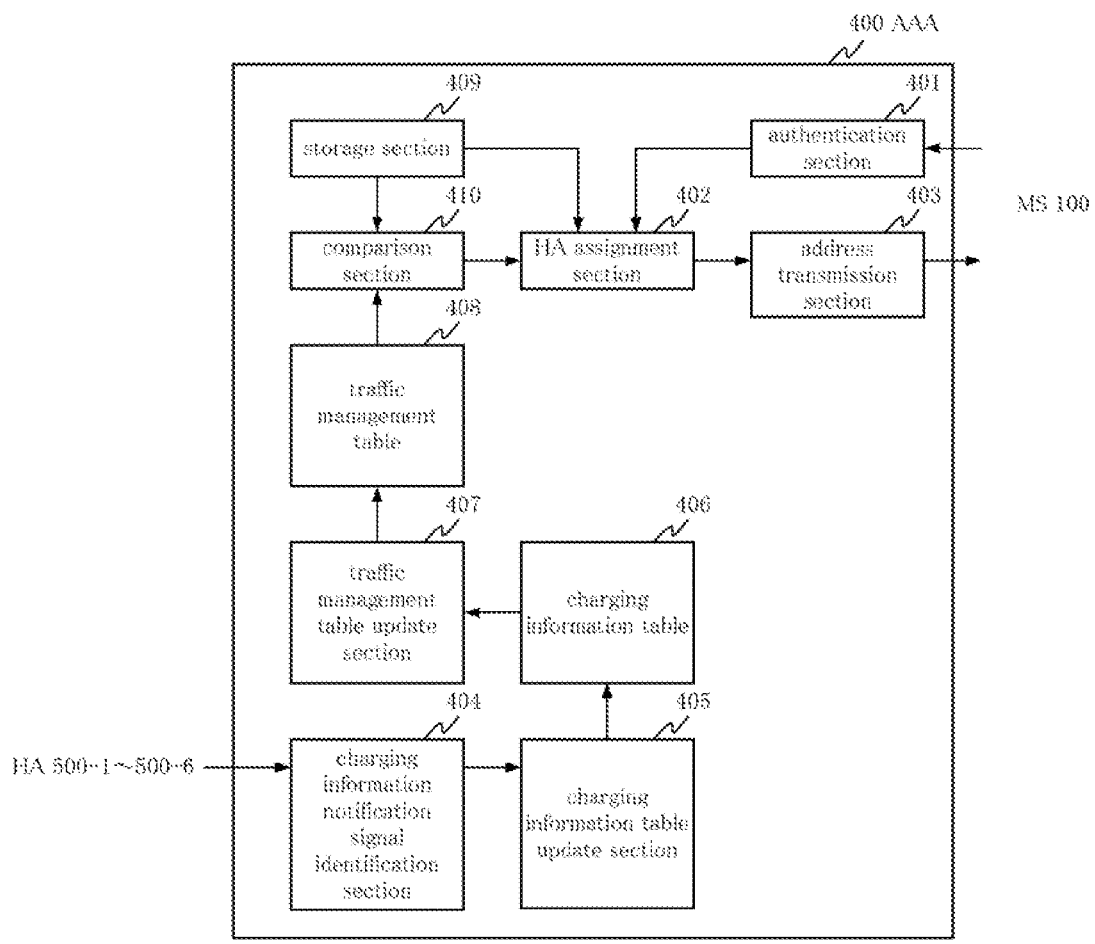
FIG. 5 is a schematic diagram showing an exemplary internal structure of an AAA shown in FIG. 4.

FIG. 5 is a schematic diagram showing an exemplary internal structure of AAA 400 shown in FIG. 4.

As shown in FIG. 5, AAA 400 shown in FIG. 4 is provided with authentication section 401, HA assignment section 402, address transmission section 403, charging information notification signal identification section 404, charging information table update section 405, charging information table 406, traffic management table update section 407, traffic management table 408, storage section 409, and comparison section

410. It should be noted that FIG. 5 shows only structural components according to the present invention of those that compose AAA 400.

Authentication section 401 performs an authentication process for MS 100 based on a signal transmitted therefrom. This authentication process is the same as an ordinary authentication process. Thereafter, if authentication section 401 successfully authenticates MS 100, authentication section 401 outputs information that denotes that the authentication is successful to HA assignment section 402.

HA assignment section 402 decides an HA address (LP address) to be assigned to MS 100. At this point, HA assignment section 402 reads assignment validity/invalidity information stored in storage section 409 and decides the address based on the assignment validity/invalidity information and an preset assignment algorithm that assigns an HA.

Charging information notification signal identification section 404 identifies a charging information notification signal (Accounting Request) that provides notification of charging information transmitted from HA 500-1 through 500-6. Charging information notification signal identification section 404 outputs the identified charging information notification signal to charging information table update section 405.

Figure 6:
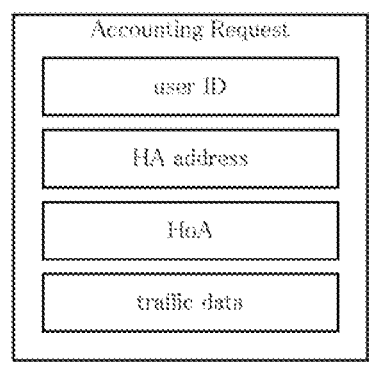
FIG. 6 is a schematic diagram showing exemplary information contained in a charging information notification signal that a charging information notification signal identifying section shown in FIG. 5 identifies.

FIG. 6 is a schematic diagram showing exemplary information contained in the charging information notification signal that charging information notification signal identification section 404 shown in FIG. 5 identifies.

As shown in FIG. 6, the charging information notification signal that charging information notification signal identification section 404 shown in FIG. 5 identifies contains a user ID (Identification) that is identification information of a user who uses terminal MS 100, an HA address of an HA that is connected, a HoA (Home Address) that is the address of a home link that MS 100 has in the HA, and traffic data that represent the traffic amount for each user.

Charging information table update section 405 updates charging information table 406 based on the charging information notification signal that is outputted from charging information notification signal identification section 404.

Charging information table 406 stores charging information with respect to HA 500-1 through 500-6.

FIG. 7 is a schematic diagram showing exemplary charging information, with respect to HA 500-1 through 500-6, that is stored in charging information table 406 shown in FIG. 5.

As shown in FIG. 7, in charging information table 406 shown in FIG. 5, session IDs that are connection information, user IDs contained in the charging information notification signal, HA addresses, HoAs, and traffic data are correlatively stored.

For example, session ID "00000," user ID "#0," HA address "500-1," HoA "a," and traffic data "A" are correlatively stored. This denotes that a connection whose session ID is "00000" is a connection between an MS whose user ID is "#0" and an HA whose HA address is "500-1" and that the HoA is "a" and the traffic data (traffic amount) is "A."

In addition, session ID "00001," user ID "#1," HA address "500-1," HoA "b," and traffic data "B" are correlatively stored. This denotes that a connection whose session ID is "00001" is a connection between an MS whose user ID is "#1" and an HA whose HA address is "500-1" and that the HoA is "b" and the traffic data (traffic amount) is "B."

In addition, session ID "00002," user ID "#2," HA address "500-2," HoA "c," and traffic data "C" are correlatively stored. This denotes that a connection whose session ID is "00002" is a connection between an MS whose user ID is "#2" and an HA whose HA address is "500-2" and that the HoA is "c" and the traffic data (traffic amount) is "C."

In addition, session ID "00004," user ID "#4," HA address "500-3," HoA "d," and traffic data "D" are correlatively stored. This denotes that a connection whose session ID is "00004" is a connection between an MS whose user ID is "#4" and an HA whose HA address is "500-3" and that the HoA is "d" and the traffic data (traffic amount) is "D."

In addition, session ID "00005," user ID "#5," HA address "500-1," HoA "e," and traffic data "E" are correlatively stored. This denotes that a connection whose session ID is "00005" is a connection between an MS whose user ID is "#5" and an HA whose HA address is "500-1" and that the HoA is "e" and the traffic data (traffic amount) is "E."

Traffic management table update section 407 updates traffic management table 408 based on traffic data stored in charging information table 406.

Traffic management table 408 stores and manages traffic data with respect to each of HA 500-1 through 500-6.

FIG. 8 is a schematic diagram showing exemplary traffic data, with respect to each of HA 500-1 through 500-6, that are stored in traffic management table 408 shown in FIG. 5.

As shown in FIG. 8, traffic data, per total unit time with respect to each of HA 500-1 through 500-6, are stored in traffic management table 408 shown in FIG. 5.

For example, HA address "500-1" and total traffic data "L" are correlatively stored. This denotes that the total traffic data (traffic amount) with respect to an HA whose HA address is "500-1" is "L."

In addition, HA address "500-2" and total traffic data "M" are correlatively stored. This denotes that the total traffic data (traffic amount) with respect to an HA whose HA address is "500-2" is "M."

In addition, HA address "500-3" and total traffic data "N" are correlatively stored. This denotes that the total traffic data (traffic amount) with respect to an HA whose HA address is "500-3" is "N."

Storage section 409 stores a preset and predetermined threshold. This predetermined threshold is a threshold for determining whether or not HA 500-1 through 500-6 are assignable as connection devices that connect MS 100. In addition, storage section 409 stores assignment validity/invalidity information that denotes whether or not HA 500-1 through 500-6 can be assigned as a connection device that connects MS 100 with respect to each of HA 500-1 through 500-6.

FIG. 9 is a schematic diagram showing exemplary assignment validity/invalidity information stored in storage section 409 shown in FIG. 5.

As shown in FIG. 9, assignment validity/invalidity information that denotes whether or not an HA can be assigned as a connection device that connects MS 100 with respect to each of HA 500-1 through 500-6 is stored in storage section 409 shown in FIG. 5.

For example, HA address "500-1" and assignment validity/invalidity information "invalid" are correlatively stored. This denotes that an HA whose HA address is "500-1" cannot be assigned as a connection device that connects MS 100.

In addition, HA address "500-2" and assignment validity/invalidity information "valid" are correlatively stored. This denotes that an HA whose HA address is "500-2" can be assigned as a connection device that connects MS 100.

In addition, HA address "500-3" and assignment validity/invalidity information "valid" are correlatively stored. This denotes that an HA whose HA address is "500-3" can be assigned as a connection device that connects MS 100.

Comparison section 410 reads the total traffic data (traffic amount) with respect to HA 500-1 through 500-6 from traffic management table 408, also reads the threshold stored in storage section 409, and compares the total traffic data with the threshold. Thereafter, the assignment validity/invalidity information stored in storage section 409 is updated based on the compared result.

In the following, the method that assigns HA 500-1 through 500-6 and that is executed by AAA 400 shown in FIG. 5 will be described. First, a process that manages traffic data with respect to HA 500-1 through 500-6 and that is included in the method that assigns HA 500-1 through 500-6 and that is executed by AAA 400 will be described.

Figure 10:
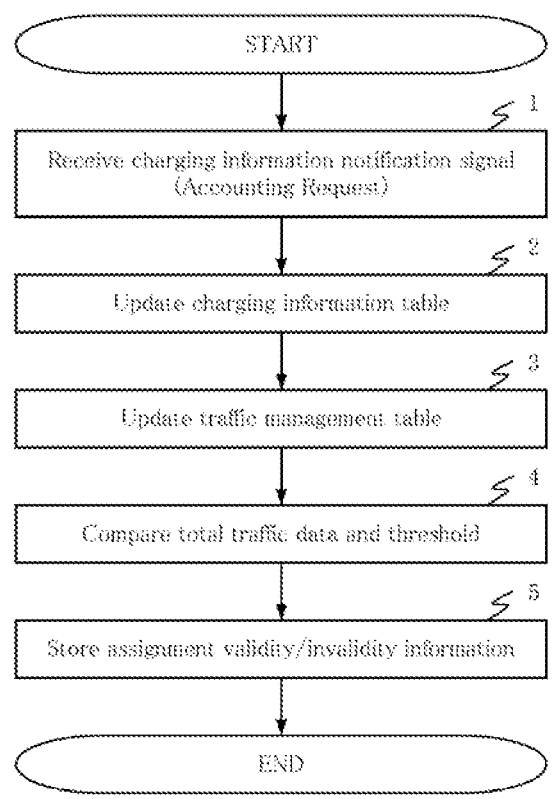
FIG. 10 is a flowchart describing a process that manages traffic data with respect to HAs and that are included in a method that assigns an HA and executed by the AAA shown in FIG. 5.

FIG. 10 is a flowchart describing the process that manages traffic data, with respect to HA 500-1 through 500-6, that is included in the method that assigns HA 500-1 through 500-6 and executed by AAA 400 shown in FIG. 5.

When the reception of the charging information notification signal (Accounting Request) transmitted from HA 500-1 through 500-6 is identified by charging information notification signal identification section 404 at step 1, the identified charging information notification signal is outputted from charging information notification signal identification section 404 to charging information table update section 405.

Then, at step 2, charging information table 406 is updated by charging information table update section 405 based on the charging information notification signal.

Specifically, a user ID, an HA address, an HoA, and traffic data contained in the charging information notification signal is written whenever a session starts.

Thereafter, at step 3, traffic management table 408 is updated by traffic management table update section 407.

Specifically, an HA address and traffic data corresponding thereto are read from charging information table 406 by traffic management table update section 407 and the total traffic data of traffic management table 408 are updated based on the HA address and the traffic data that are read.

Here, information stored in charging information table 406 shown in FIG. 7 and information stored in traffic management table 408 shown in FIG. 8 are exemplified.

Traffic data whose HA addresses stored in charging information table 406 shown in FIG. 7 are identical are added and stored in traffic management table 408 shown in FIG. 8. In other words, in the example shown in FIG. 7, since traffic data whose HA address is "500-1" are "A," "B," and "E," traffic data "A," traffic data "B," and traffic data "E" are added and written as total traffic data "L" that are traffic data per total unit time with respect to HA address "500-1" shown in FIG. 8. In other words, the relationship of L=A+B+E is obtained. Likewise with respect to HA 500-2, the relationship of M=C is obtained. Likewise with respect to HA 500-3, the relationship of N=D is obtained.

Thereafter, the total traffic data of traffic management table 408 that has been updated are read by comparison section 410. In addition, the threshold stored in storage section 409 is read by comparison section 410.

Then, at step 4, the total traffic data that are read from traffic management table 408 and the threshold that is read from storage section 409 are compared by comparison section 410.

At step 5, the compared result is written (stored) to storage section 409 by comparison section 410.

Specifically, if the total traffic data that are read from traffic management table 408 are equal to or greater than the threshold that is read from storage section 409, "invalid" is written as assignment validity/invalidity information with respect to the HA to storage section 409. In contrast, if the total traffic data that are read from traffic management table 408 are smaller than the threshold that is read from storage section 409, "valid" is written as the assignment validity/invalidity information with respect to the HA to storage section 409.

Next, a process that assigns addresses of HA 500-1 through 500-6 and that is included in the method that assigns HA 500-1 through 500-6 and that is executed by AAA 400 will be described.

Figure 11:
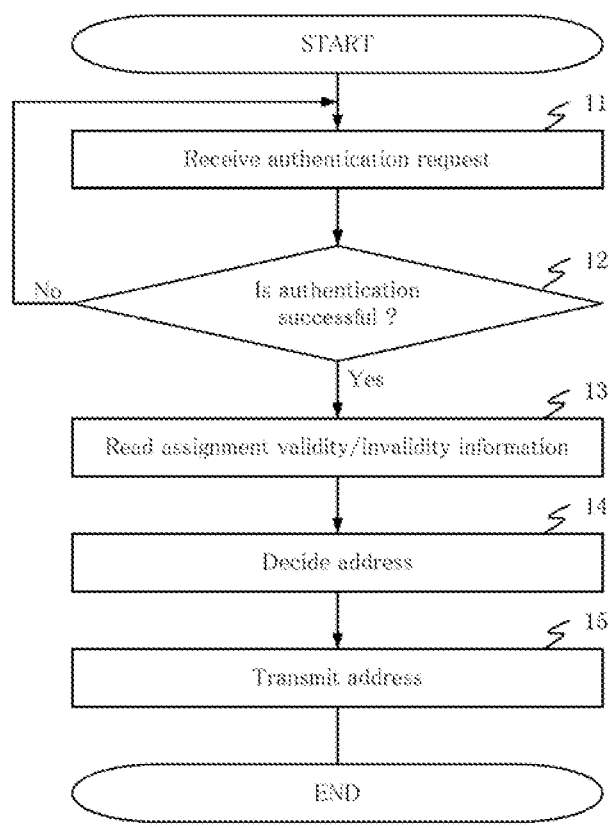
FIG. 11 is a flowchart describing a process that assigns an HA address and that is included in the method that assigns an HA and that is executed by the AAA shown in FIG. 5

FIG. 11 is a flowchart describing the process that assigns addresses of HA 500-1 through 500-6 and that is included in the method that assigns HA 500-1 through 500-6 and that is executed by AAA 400 shown in FIG. 5.

When an authentication request that requests authentication is received from MS 100 by authentication section 401 at step 11, then MS 100 is authenticated by authentication section 401 at step 12. This authentication method is the same as an ordinary authentication method.

If the authentication is successful at step 12, information that denotes that the authentication is successful is outputted from authentication section 401 to HA assignment section 402.

Then, at step 13, assignment validity/invalidity information, with respect to HA 500-1 through 500-6, that is stored in storage section 409 is read by HA assignment section 402.

Then, at step 14, an HA (HA address) that connects MS 100 and the network is decided by HA assignment section 402 based on a preset assignment algorithm that serves to assign an HA and the assignment validity/invalidity information with respect to HA 500-1 through 500-6 that is read from storage section 409. The decided HA address is outputted from HA assignment section 402 to address transmission section 403.

For example, although the address decided by the preset algorithm is HA 500-1, if the assignment validity/invalidity information, with respect to HA500-1, that is read from storage section 409 is "invalid," one of the addresses of HA 500-2 to 500-6 other than HA 500-1 is decided as an HA address assigned to MS 100.

An HA address may be decided based only on the assignment validity/invalidity information, with respect to HA 500-1 through 500-6, that is read from storage section 409. In other words, any one of HA addresses from those whose assignment validity/invalidity information is not "invalid", with respect to HA 500-1 through 500-6, that is read from storage section 409 may be decided.

At step 15, the address that is outputted from HA assignment section 402 is transmitted from address transmission section 403 to MS 100.

In such a manner, AAA 400 computes the total traffic data with respect to each of HA 500-1 through 500-6 based on traffic data contained in the charging information notification signals transmitted from HA 500-1 through 500-6. If the computed total traffic data exceed the predetermined threshold, when an HA that connects MS 100 and the network is assigned, any HA other than an HA whose total traffic data exceed the predetermined threshold will be assigned. Thus, a situation in which MS 100 cannot be connected to the network can be avoided.

In addition, since AAA 400 determines whether or not HA 500-1 through 500-6 can connect MS 100 to the network based on traffic data contained in the charging information notification signals transmitted from HA 500-1 through 500-6, it is not necessary to change the device structure of the existing HA 500-1 through 500-6.

The above-described process of AAA 400 may be executed by a logic circuit that is created depending on the intended use. Alternatively, a program that describes the content of the process as a procedure may be recorded to a record medium from which AAA 400 can read and AAA 400 is caused to read the program from the record medium and execute it. Record mediums that AAA 400 can read include memories such as ROM and RAM and an HDD that are built in AAA 400 besides movable record mediums such as a floppy disk (registered trademark), a magneto-optical disc, a DVD, and a CD. The program recorded on the record medium is read by a CPU (not shown) disposed in AAA 400 and executes the process that is the same as the above-described one under the control of the CPU. In this example, the CPU operates as a computer that executes the program that is read from the record medium.

Now, the present invention has been described with reference to the embodiments. However, it should be understood by those skilled in the art that the structure and details of the present invention may be changed in various manners without departing from the scope of the present invention.

The invention claimed is:

1. An authentication server that is connected to a plurality of connection devices that connect a communication terminal and a network, that authenticates said communication terminal, and assigns one of said plurality of connection devices as a connection device that connects said communication terminal and said network if the authentication is successful, said authentication server comprising:
   a storage section that stores a preset threshold;
   a traffic management table that manages traffic data with respect to each said connection device, said traffic data representing a traffic amount, with respect to said connection device, that is contained in a charging information notification signal that provides notification of charging information transmitted from said connection device, the charging information notification signal comprising current charging rate information transmitted from a charging rate server, the current charging rate information comprising the traffic data;
   a comparison section that compares said traffic data, with respect to each said connection device, with the threshold stored in said storage section and writes the compared result as assignment validity/invalidity information to said storage section, wherein the traffic data is compared with the threshold; and
   an HA assignment section that reads the assignment validity/invalidity information from said storage section and assigns a connection device other than connection devices whose assignment validity/invalidity information is invalid as a given connection device that connects said connection terminal and said network, wherein the HA assignment section of the authentication server assigns the given connection device based on a result of the comparison made by the comparison section between the traffic data and the threshold,
   wherein the charging information includes the traffic data, wherein the given connection device is assigned based on a comparison result resulting from comparison of the traffic data and the threshold,
   wherein if said traffic data are equal to or greater than said threshold, said comparison section writes said assignment validity/invalidity information that is caused to be invalid to said storage section,
   and wherein if said traffic data are smaller than said threshold, said comparison section writes said assignment validity/invalidity information that is caused to be valid to said storage section.

2. The authentication server as set forth in claim 1, characterized in that said authentication server further comprises:
   a charging information table that stores the traffic data, with respect to each user, that are contained in said charging information notification signal; and
   a traffic management table update section that computes the traffic data with respect to each said connection device based on the traffic data, with respect to each user, that are stored in said charging information table and writes the computed traffic data with respect to each connection device to said traffic management table.

3. The authentication server as set forth in claim 2, characterized in that said traffic management table update section adds the traffic data, with respect to each user and with respect to each said connection device, that are stored in said charging information table.

4. The authentication server as set forth in claim 1, characterized in that said authentication server is used for a WiMAX system.

5. A communication system, characterized in that said communication system comprises:
   an authentication server as set forth in claim 1; and
   a plurality of connection devices that connect a communication terminal and a network.

6. The communication system as set forth in claim 5, characterized in that said communication system is a WiMAX system.

7. A connection device assignment method that assigns a connection device that connects a communication terminal and a network from a plurality of connection devices, said connection device assignment method comprising:
   a step that manages traffic data with respect to each said connection device, said traffic data representing a traffic amount, with respect to said connection device, that is contained in a charging information notification signal that provides notification of charging information transmitted from said connection device, the charging information notification signal comprising current charging rate information transmitted from a charging rate server, the current charging rate information comprising the traffic data;
   a step that compares said traffic data, with respect to each said connection device, with a preset threshold, wherein the traffic data is compared with the threshold; and
   a step that assigns one of said plurality of connection devices as a connection device that connects said communication terminal and said network based on the compared result, such that the given connection device is assigned based on a result of the comparison between the traffic data and the threshold,
   wherein the charging information includes the traffic data, wherein the given connection device is assigned based on a comparison result resulting from comparison of the traffic data and the threshold,
   wherein if said traffic data are equal to or greater than said threshold, said step that compares said traffic data writes said assignment validity/invalidity information that is caused to be invalid,
   and wherein if said traffic data are smaller than said threshold, said step that compares said traffic data writes said assignment validity/invalidity information that is caused to be valid.

8. The connection device assignment method as set forth in claim 7, characterized in that said connection device assignment method further comprises:
   a step that assigns a connection device other than connection devices whose traffic data are equal to or greater than said threshold as a connection device that connects said communication terminal and said network based on the compared result.

* * * * *